W. R. BELDAM.
MEANS FOR PACKING JOINTS.
APPLICATION FILED AUG. 22, 1919.
1,339,156.
Patented May 4, 1920.
2 SHEETS—SHEET 2.
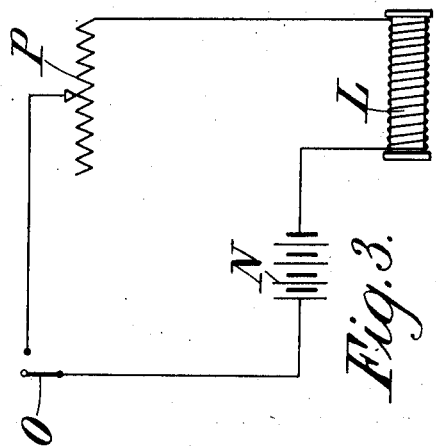
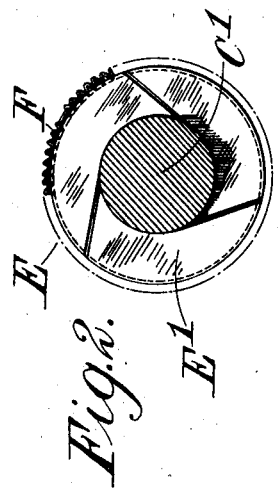
Inventor
William R. Beldam
by his attorneys
Bakewell, Byrnes & Parmelee

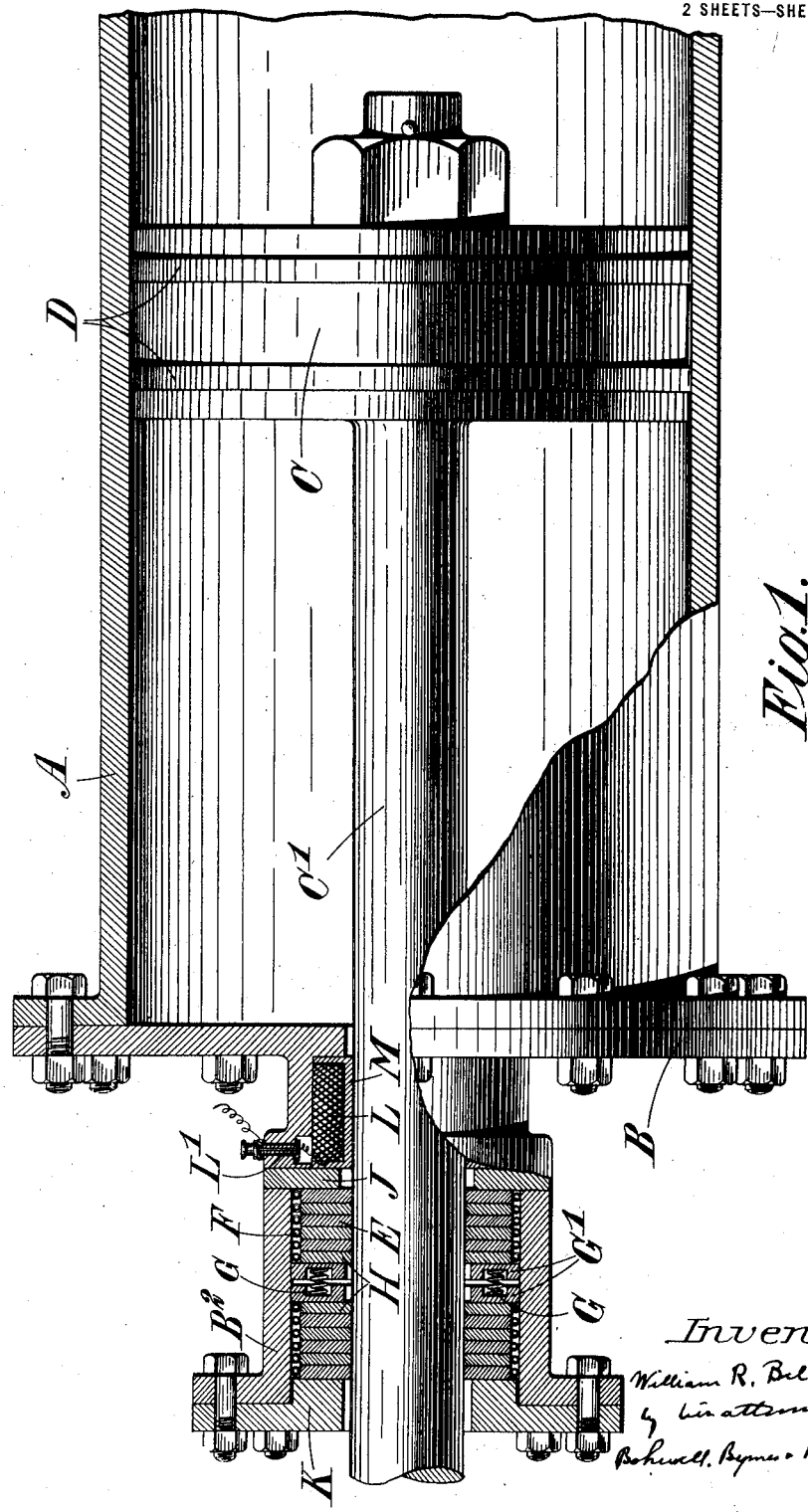

UNITED STATES PATENT OFFICE.

WILLIAM ROBERT BELDAM, OF LONDON, ENGLAND.

MEANS FOR PACKING JOINTS.

1,339,156.   Specification of Letters Patent.   Patented May 4, 1920.

Application filed August 22, 1919. Serial No. 319,103.

*To all whom it may concern:*

Be it known that I, WILLIAM ROBERT BELDAM, subject of the King of England, residing in London, England, have invented a certain new and useful Means for Packing Joints, of which the following is a specification.

This invention relates to metallically-packed fluid-tight joints for pistons, piston-rods and other movable members, of the kind wherein the metallic packing is in the form of paramagnetic material, for example iron-rings, and wherein either the member to be packed that is movable relatively to the metallic packing, or that member to be packed relatively to which the metallic packing is moved, is also composed of paramagnetic material.

The invention has for its main object to provide means other than mechanical for drawing the metallic packing toward the member with which it makes joint.

Another object is to enable ready adjustment of the force with which the metallic packing is seated on the member with which it coöperates to make the joint fluid-tight.

A further object is to provide a control for the metallic packing, whereby the force with which it makes the joint fluid-tight can be regulated from a distance.

A metallically-packed fluid-tight joint of the kind described according to this invention is provided with magnetizing means, for example a magnetizing coil, arranged so that its flux traverses the paramagnetic packing-material and the paramagnetic member to tend to pull the same together.

Conveniently, the magnetizing coil surrounds the paramagnetic member, for example a piston-rod, and may be situated within or adjacent to one end of the other member, for example a stuffing-box for the paramagnetic member, wherein the paramagnetic packing-material is mounted.

When the invention is applied to a metallically-packed piston which has its rod metallically-packed in a stuffing-box at one end of its cylinder, a single magnetizing coil may be used which is common to the two metallically-packed joints and is situated between the metallic packing in the stuffing-box and the metallic packing of the piston, for the purpose of effecting economy of material and simplicity of construction.

In order that a metallically-packed joint according to the invention may be controlled by an operator at a distance from the machine comprising the joint, remote control means may be provided for the magnetizing means applied to the joint.

To these ends, the invention consists of the construction, arrangement and combination of parts described hereinafter and pointed out in the claims.

One embodiment of the invention is diagrammatically illustrated by way of example in the accompanying drawing wherein:—

Figure 1 shows in elevation, partly in vertical section and partly broken away, a cylinder and its piston and piston-rod to which the invention is applied.

Fig. 2 is a detail sectional view, and

Fig. 3 is a diagram of connections explained hereinafter.

Like reference letters designate like parts throughout the several views.

Referring to the drawing, a cast-iron cylinder A having an iron cover B provided with a stuffing-box $B^2$ contains an iron piston C which has a mild steel piston rod $C^1$ extending through the stuffing-box, the piston being provided in the usual manner with steel piston-rings D.

The piston-rod $C^1$ is packed in the stuffing-box $B^2$ by means of paramagnetic packing-material in the form of a number of iron rings E surrounding the rod.

As shown in Fig. 2, each of these rings comprises several segmental members $E^1$ shaped to overlap one another and to bear one on another, each ring being held together by a steel coil spring F seated in a groove formed in its outer periphery. The rings are divided into two groups which are separated and pressed apart by compression coil springs G which are housed in brass rings $G^1$, bearing on two plates H, one at the end of each group. The other end of the inner group bears against abutments J secured in the wall of the stuffing-box; bolted to the outer end of the stuffing-box is secured a gland K which bears against the other end of the other group of rings. The metallic packing in the stuffing-box arranged as described above and also that provided on the piston is well known in itself.

According to the present invention magnetizing means which may be in the form of a magnetizing coil L is arranged so that its flux traverses the packing-rings E and the piston-rod $C^1$ in such a direction that a magnetic pull is exerted between the two. In the embodiment illustrated, a coil L wound on a brass spool M and having its ends connected to binding posts L¹, whereof only one is shown, surrounds the piston-rod within that portion of the stuffing-box B² which is situated between the metallic packing E and the cylinder-cover B. This coil may be energized from any convenient source of current. As shown in Fig. 3, its one end is connected with a battery N which can be connected by a switch O to an adjustable contact-piece of a variable resistance P to which is connected the other end of the coil L.

When the described energizing circuit of the magnetizing coil L is closed it will be seen that the magnetic flux will traverse the piston-rod C¹ and the rings E in a direction to cause the latter to be firmly seated on the rod, whereby a fluid-tight joint is secured. At the same time owing to the coil L being situated between the packing rings E and the piston C the flux will also pass through the piston and the piston-rings to the cylinder, so that the piston-rings will be magnetically pulled against the wall of the cylinder, whereby a fluid-tight joint at the piston is also assured. The purpose of this arrangement is to enable one magnetizing coil to be used for influencing two metallically packed joints. By adjusting the variable resistance P the pressure with which either set of rings is pulled magnetically toward its coöperating paramagnetic member can be varied without actually touching any of the parts between which the pressure occurs. Circumferential springs, as at F may be provided in the usual manner to assist in assembling the parts, but need not be left on the segments. On the other hand, they need not be removed since their additional pressure will not ordinarily be objectionable.

In the construction illustrated a return path for the magnetic flux is provided through the wall of the stuffing-box, the cylinder cover and through the cylinder wall. Where necessary or desirable, a return path may be provided by steel or iron fittings specially added for this purpose.

It will be appreciated that the paramagnetic packing-material need not come directly into contact with the paramagnetic member with which it coöperates but it may be faced with a non-magnetic substance if desired to constitute a rubbing surface for the coöperating part.

What I claim as my invention and desire to secure by Letters Patent is:—

1. The combination, with a metallically-packed fluid-tight joint comprising two members that are movable one relatively to the other, and paramagnetic packing-material carried by one of said members for forming a fluid-tight joint with the other of said members which is also composed of paramagnetic material, of magnetizing means arranged so that its flux traverses the packing material and the paramagnetic member to tend to pull the same together.

2. The combination, with a metallically-packed fluid-tight joint comprising two members that are movable one relatively to the other, and paramagnetic packing-material carried by one of said members for forming a fluid-tight joint with the other of said members which is also composed of paramagnetic-material of a magnetizing coil wound around part of the paramagnetic member and arranged to exert a magnetic pull between the said member and its packing-material.

3. The combination, with a stuffing-box, a steel rod movable therein, and paramagnetic packing-material in the stuffing-box for forming a fluid-tight joint therein, of a magnetizing coil wound around part of the rod in the stuffing-box, for the purpose specified.

4. The combination, with a cylinder having a stuffing-box at one end thereof, a piston which is movable in the cylinder and has a piston-rod extending through said stuffing-box, paramagnetic packing-rings carried by the piston, and paramagnetic packing-material arranged in the stuffing-box for the piston-rod, of a magnetizing coil surrounding a portion of the piston-rod situated between the piston and the packing-material in the stuffing-box, for the purpose specified.

5. The combination, with a metallically-packed fluid-tight joint comprising two members that are movable one relatively to the other, and paramagnetic packing-material carried by one of said members for forming a fluid-tight joint with the other of said members which is also composed of paramagnetic material, of magnetizing means arranged so that its flux traverses the packing-material and the paramagnetic member to tend to pull the same together, and means for controlling the intensity of the current energizing the magnetizing coil, for the purpose specified.

6. The combination with a metallically-packed fluid-tight joint comprising two members that are movable one relatively to the other, and paramagnetic packing-material carried by one of said members for forming a fluid-tight joint with the other of said members which is also composed of paramagnetic material, of a magnetizing coil wound around part of the paramagnetic member and arranged to exert a magnetic pull between the said member and its packing material, and energizing means comprising a source of current and a variable resistance in series therewith for energizing the magnetizing coil.

In testimony whereof I affix my signature.

WILLIAM ROBERT BELDAM.